United States Patent [19]

Colligan

[11] Patent Number: 4,988,241
[45] Date of Patent: Jan. 29, 1991

[54] CUTTER WITH ANGLED DIAMOND INSERTS

[75] Inventor: Kevin J. Colligan, Snoqualmie, Wash.

[73] Assignee: The Boeing Company, Seattle, Wash.

[21] Appl. No.: 407,524

[22] Filed: Sep. 15, 1989

[51] Int. Cl.⁵ .......................... B23C 3/00; B23C 3/12
[52] U.S. Cl. ...................................... 407/51; 407/59; 407/62; 407/63
[58] Field of Search ...................... 407/42, 58, 59, 60, 407/61, 62, 63, 34, 53, 54

[56] References Cited

U.S. PATENT DOCUMENTS

| | | | |
|---|---|---|---|
| 3,715,788 | 2/1973 | Ayer | 407/42 |
| 3,913,196 | 10/1975 | Maday | 407/54 |
| 4,050,840 | 9/1977 | Skingle | 407/53 |
| 4,357,122 | 11/1982 | Hollis, Jr. et al. | 407/42 |
| 4,485,858 | 12/1984 | Cecchi | 407/42 |
| 4,512,426 | 4/1985 | Bidegaray | 407/62 |
| 4,541,756 | 9/1985 | Kubota | 407/63 |
| 4,603,364 | 7/1987 | Anderson | 219/69.1 |
| 4,655,648 | 4/1987 | Hellbergh | 407/54 |
| 4,712,949 | 12/1987 | Johnson | 407/62 |
| 4,806,050 | 2/1989 | Bryant | 407/58 |

FOREIGN PATENT DOCUMENTS 0213196 1/1961 Australia ..................... 407/61

Primary Examiner—William E. Terrell
Assistant Examiner—John R. Schwarzmann
Attorney, Agent, or Firm—Joan H. Pauly

[57] ABSTRACT

A cutter body (22, 22') has a slot (26, 26') opening onto its nominal outer cylindrical surface (24) and extending along a plane that intersects the cutter axis (X) at an acute axial rake angle (A). A flat cutter blade insert (40) with an elliptical polycrystalline diamond cutting edge (48) is secured in the slot (26, 26'). The insert (40) is positioned to produce a non-negative radial rake at each point along the cutting edge (48). Preferably, the cutter (20, 20') has a plurality of circumferentially spaced slots (26, 26') and inserts (40). The slots (26') may be arranged in a herringbone pattern to resist delamination of a workpiece. Preferably, the cutter relief angle varies along the insert (40) from a minimum at the leading end (50) to a value at the trailing end (52) equal to the minimum plus the angle between the radial lines of the cylinder (24) through the leading and trailing ends (50, 52), respectively.

17 Claims, 8 Drawing Sheets

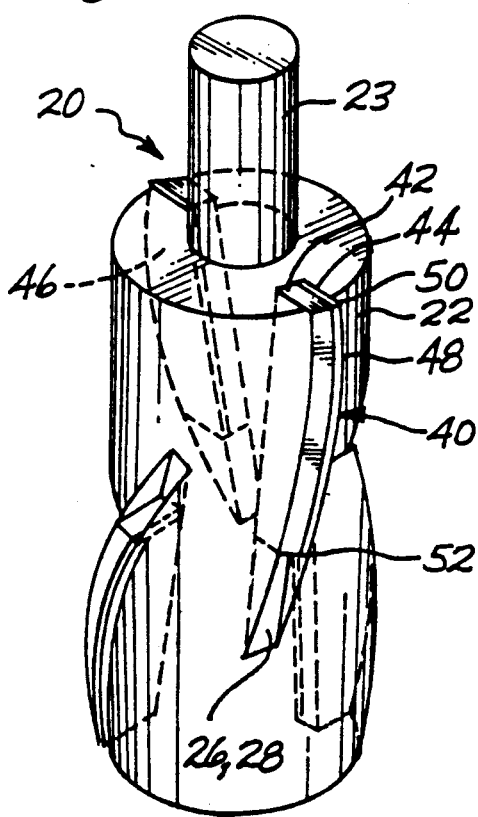
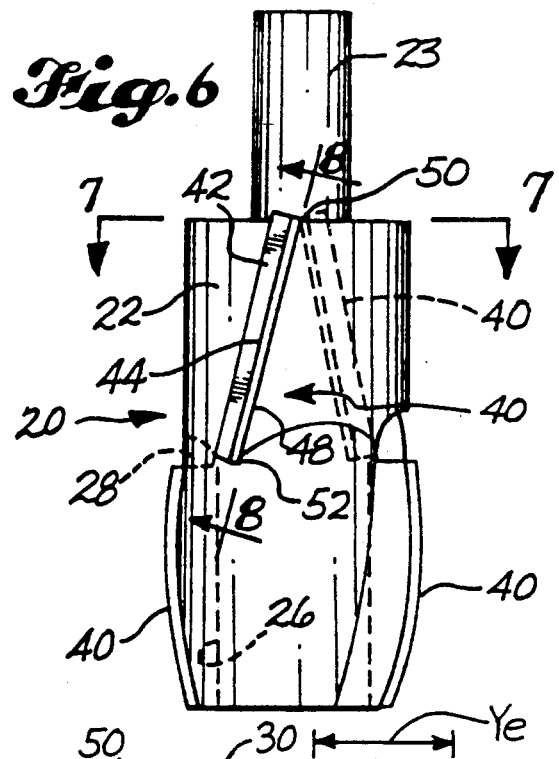
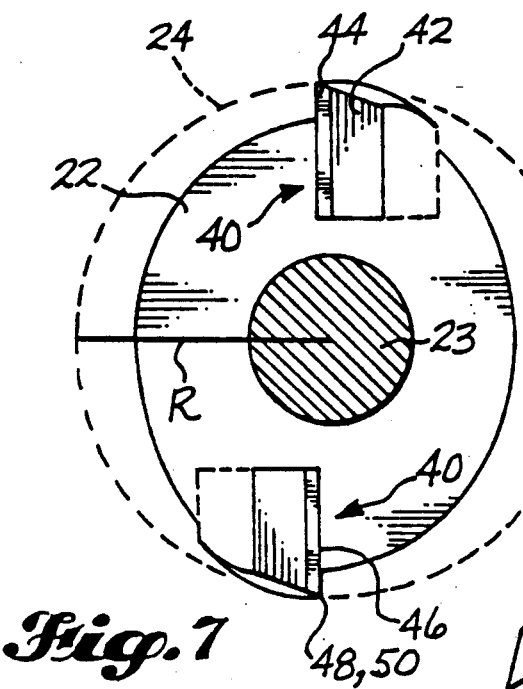
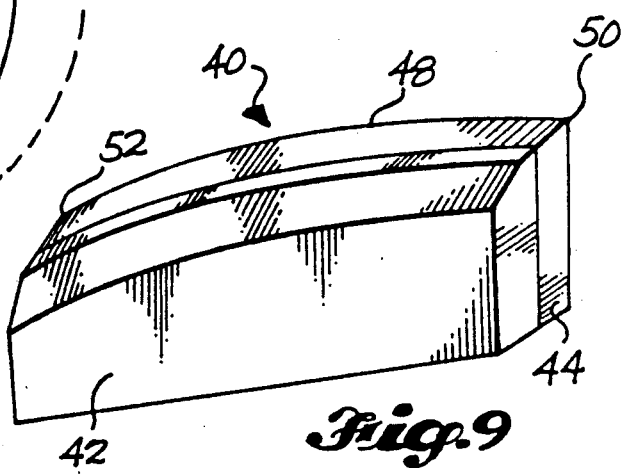

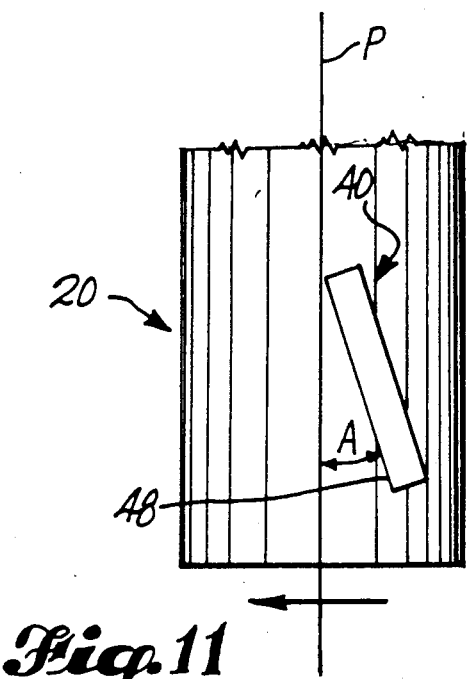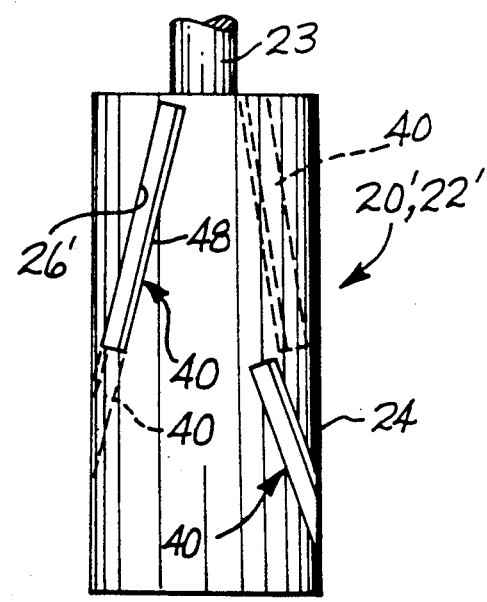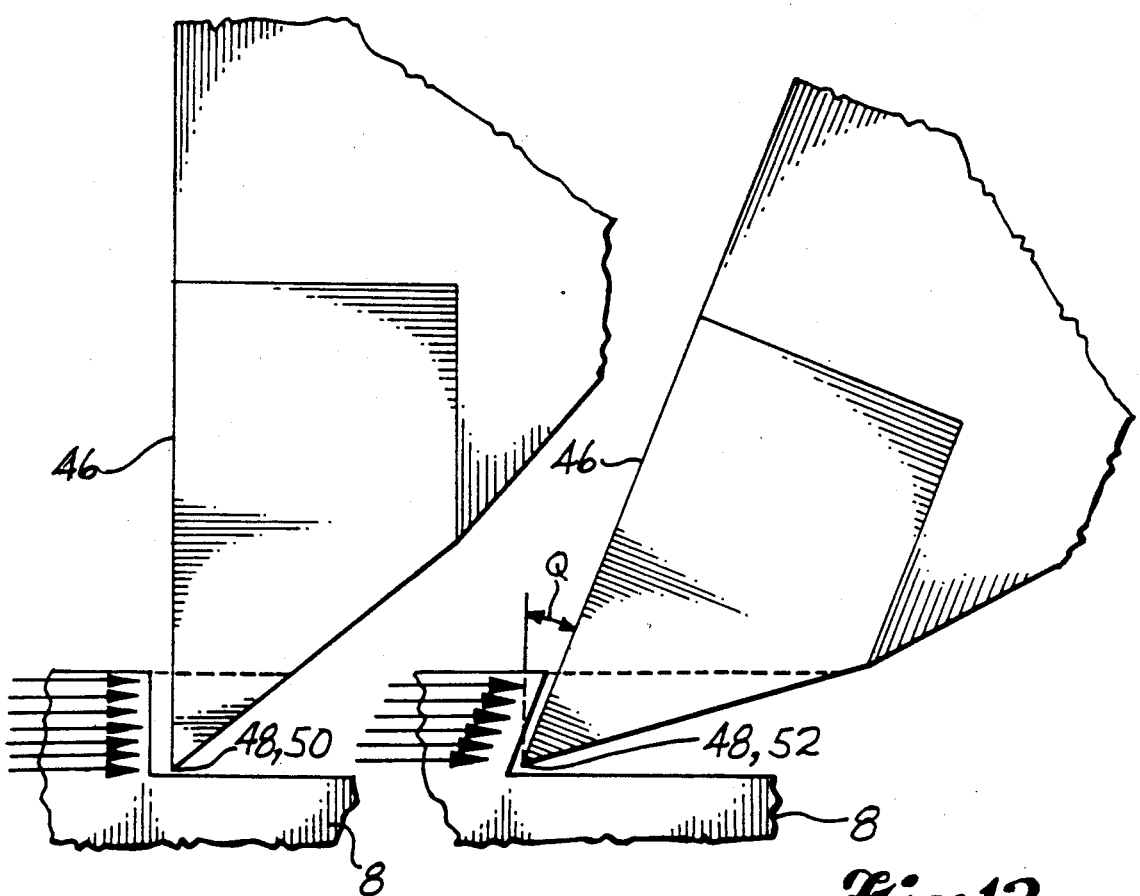

CUTTER WITH ANGLED DIAMOND INSERTS

TECHNICAL FIELD

This invention relates to rotating cutters and, more particularly, to a router for finishing the edges of composite material workpieces, said router having flat cutter blade inserts that have cutting edges formed by polycrystalline diamond and that are secured in slots on the cutter body extending along planes that intersect the longitudinal axis of the cutter at an acute axial rake angle.

BACKGROUND ART

Advanced composite materials are being used increasingly in the aerospace and other industries. The materials include a number of layers or plies which have reinforcing fibers in various woven patterns or unidirectional orientations, such as 0°, 90°, and ±45°. In many of the materials, the reinforcement is provided by graphite fibers Graphite fibers are very hard and make the composite materials abrasive This results in very high wear rates of cutters used to trim the edges of workpieces made from such materials. In order to counteract the problem of excessive wear, polycrystalline diamond (PCD) cutting edges are sometimes used to machine composite material parts having graphite reinforcing fibers. The PCD cutting edges have wear resistance superior to more conventional cutting edge materials.

In spite of their superior wear resistance, the use of PCD cutting elements has presented a number of problems. PCD elements are relatively expensive and are only available in the form of flat wafers Since PCD material is very brittle, the flat wafers cannot be bent even a small amount. Therefore, they cannot be used to construct a cutter with a helical cutting blade.

Because of the limitation of PCD cutting blades to a flat configuration, currently available PCD cutters are made with the cutting blade and cutting edge parallel to the longitudinal axis of the cutter, as illustrated in FIGS. 1 and 2. This cutting blade configuration has resulted in a number of problems which have greatly decreased the practical usefulness of cutters with PCD cutting elements The main problems that have been experienced are excessively high cutting forces and insufficient quality of the surface finish of the workpiece. The high cutting forces are caused by the fact that every point along the full length of the PCD cutting edge hits the workpiece being trimmed at the same time. When the full length of the cutting element hits the workpiece, high impact forces are created. These forces cause excessive vibrations in the workpiece and in the spindle of the cutter. In addition, the high cutting forces generally prohibit the use of known types of cutters with PCD cutting elements in hand-held routers.

The relatively poor surface finish obtainable by use of known types of cutters with PCD cutting blades is primarily a result of the fact that all of the cutting forces are coplanar with the layers of the composite material laminate. Two main types of degrading phenomena are observed in workpieces machined with known cutters. One of these is a commonly observed phenomenon in which some of the plies of the workpiece are cut deeper than others. Although the finished edge may appear to be smooth to the naked eye, under a microscope the differences in the plies are clearly observed These differences give the workpiece a poor surface finish relative to the standards of the aerospace industry. The phenomenon is illustrated in greatly exaggerated form in FIG. 4. Therein, it can be seen that the plies of the workpiece with 0° unidirectional fibers, i.e. fibers that run in the same direction as the direction of the cutter feed, tend to cut deeper than the other plies. The problem of differential depth of cut is especially pronounced in relation to workpieces having thermoplastic resin matrices.

FIG. 3 illustrates another commonly observed phenomenon of the surface finish obtained using known types of PCD cutters. This phenomenon occurs primarily in plies having −45° fibers. The phenomenon is also observed, to a lesser degree, in +45° and 90° plies. The fibers in such layers tend to be bent and bunched up by the cutter as it moves across the workpiece. Voids are formed between the bunches of fibers. These voids are clearly visible under microscopic examination. The resulting uneven and discontinuous nature of the machined edge of the layers significantly degrades the surface finish of the workpiece.

DISCLOSURE OF THE INVENTION

The basic cutter of the invention comprises a body and an essentially flat cutter blade insert. The body has a nominal outer surface defining a cylinder with a longitudinal axis and a cutting radius. A slot opens onto the outer surface of the body and extends along a plane that intersects the longitudinal axis at an acute axial rake angle. The insert is secured in the slot and has an elliptical cutting edge extending along the outer surface. In most situations, the cutter preferably has a non-negative radial rake at each point along its cutting edge. This is produced by positioning the insert so that no radial line of the cylinder through any point on the cutting edge is circumferentially on a different side of the cutting face which forms the cutting edge than a radial line of the cylinder through any other point on the cutting edge. Although the cutter of the invention may be used with cutting edges made from various types of materials, it is anticipated that cutter blade inserts comprising a flat wafer of polycrystalline diamond which forms the cutting edge will be used primarily in the manufacture of the cutter of the invention.

A preferred feature of the cutter is a cutter body with a plurality of slots and a plurality of inserts. Each insert is secured in a different one of the slots. The slots may be arranged relative to each other in various manners. In a first preferred embodiment, the slots are circumferentially spaced on the cylindrical outer surface, and each slot has the same axial rake angle. In a second preferred embodiment, the slots are arranged in a herringbone pattern to produce axial cutting forces that resist delamination of the workpiece. The resistance to delamination is preferably produced by downward axial cutting forces on the upper portion of the workpiece and upward axial cutting forces on the lower portion of the workpiece. Because of the reduced tendency to delaminate the workpiece, the use of the herringbone pattern has the additional advantage of allowing a higher axial rake angle without risking damage to the workpiece.

The unconventional axial rake arrangement of the cutter of the invention complicates the calculation of the relief angle required to prevent contact between the cutter and a workpiece behind the cutting edge. The requirements for the relief angle vary from the first leading end of the cutting edge to the second opposite end. A minimum relief angle is required at the first end. A feature of the invention is a cutter with a first relief angle at the first end at least as great as the minimum relief angle, and a second relief angle at the second end at least as great as the minimum relief angle plus the angle between the radial lines of the cutter body cylinder through the first and second ends, respectively. The first and second relief angles may be equal to each other with the cutter having a constant relief angle along the insert equal to the second relief angle. More preferably, the cutter has a variable relief angle along the insert. In the preferred embodiment, this relief angle varies from a minimum value equal to the minimum relief angle at the leading end to a maximum value equal to the second relief angle at the opposite end.

The invention also encompasses a method of making a cutter with a cutting edge formed by a flat piece of polycrystalline diamond. According to an aspect of the invention, the method comprises forming a body having a nominal outer surface defining a cylinder with a longitudinal axis and a cutting radius. A slot is formed in the body opening onto the outer surface and extending along a plane that intersects the axis at an acute axial rake angle. An essentially flat cutter blade insert is provided which includes a piece of polycrystalline diamond with a cutting face having an outer edge that forms an elliptical cutting edge. The insert is positioned and secured in the slot in a position in which the elliptical cutting edge extends along the outer surface of the cylinder. The method also includes determining a minimum relief angle required at the leading end of the cutting edge to prevent contact between the cutter and a workpiece behind the cutting edge. A relief angle is formed on the cutter along the insert. This relief angle is, at the leading end of the cutting edge, at least as great as the minimum relief angle At the opposite end of the cutting edge, the relief angle is at least as great as the minimum relief angle plus the angle between radial lines of the cylinder through the leading and opposite ends of the cutting edge, respectively. The relief angle may be constant along the insert or may vary from a minimum value at the leading end to a maximum value at the opposite end.

The method and apparatus of the invention solve the problems discussed above that have been encountered in connection with previous systems for machining the edges of composite material workpieces. The invention makes it possible to use polycrystalline diamond cutting edges to avoid excessive wear rates while, at the same time, avoiding the types of problems which have previously been encountered in connection with the use of PCD cutting elements. The invention accomplishes this by providing a cutting geometry which approximates a helical geometry but still accommodates the flat wafer configuration of available PCD cutting elements.

The axial rake angle of the cutter blade insert of the invention causes the cutting blade of the insert to gradually come into contact with a workpiece. Therefore, the impact of the cutter on the workpiece is greatly reduced, and the previously encountered problem of excessively high cutting forces is avoided. Consequently, excessive vibrations in the workpiece and the spindle of the cutter are also avoided. This helps to prevent damage to the workpiece and/or cutter mechanism during the routing operation and contributes to the attainment of a high quality surface finish. The significantly reduced cutting forces may also make it possible to use cutters with PCD cutting elements in hand-held routers.

The axial rake orientation of the insert also produces a component of the cutting force perpendicular to the layers of the composite material workpiece. This perpendicular component helps to eliminate the quality degrading phenomena that have been observed in known types of PCD cutters in which all of the cutting forces are coplanar with the layers of the workpiece. The perpendicular component tends to stabilize the non 0° reinforcing fibers in the workpiece. The stabilization of the fibers tends to reduce the difference between the cutting depth of 0° plies and other plies and the previously experienced unevenness of the edges of the non 0° plies, in particular the −45° plies.

The invention accomplishes the elimination or great reduction of all of these problems in an efficient and economical manner. The structure of the cutter of the invention is relatively simple and may readily be varied to adapt it to the needs of a particular situation. The manufacture of the cutter can be carried out relatively easily and inexpensively. In addition, the cutter of the invention facilitates the routing and surface finishing stages of the manufacture of composite material parts and helps to reduce the cost of manufacturing such parts by reducing the number of parts which must be rejected as not meeting quality standards.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 5 is a pictorial view of the first preferred embodiment of the cutter of the invention.

FIG. 6 is an elevational view of the cutter shown in FIG. 5.

FIG. 7 is an end view of the cutter shown in FIGS. 5 and 6 with the spindle shown in section.

FIG. 8 is a sectional view taken along the line 8—8 in FIG. 6 showing the plane of the insert cutting face.

FIG. 9 is a pictorial view of the insert.

FIG. 10 is an elevational view similar to FIG. 6 but showing a second preferred embodiment of the cutter.

FIG. 11 is a schematic elevational view and FIGS. 12 and 13 are schematic end views Illustrating the radial rake of the cutter shown in FIGS. 5-10.

BEST MODES FOR CARRYING OUT THE INVENTION

The drawings illustrate two embodiments 20, 20' of the cutter of the invention which constitute the best modes of the apparatus of the invention currently known to the applicant. The drawings also illustrate the best modes for carrying out the method of the invention currently known to the applicant. It is anticipated that the invention will be practiced primarily in connection with routers having polycrystalline diamond cutting elements for finishing the edges of composite material workpieces. However, it is of course to be understood that the method and apparatus of the invention may also be used to advantage in connection with other types of cutters intended for use with either composite material workpieces or workpieces made from other types of materials.

Figure 1:
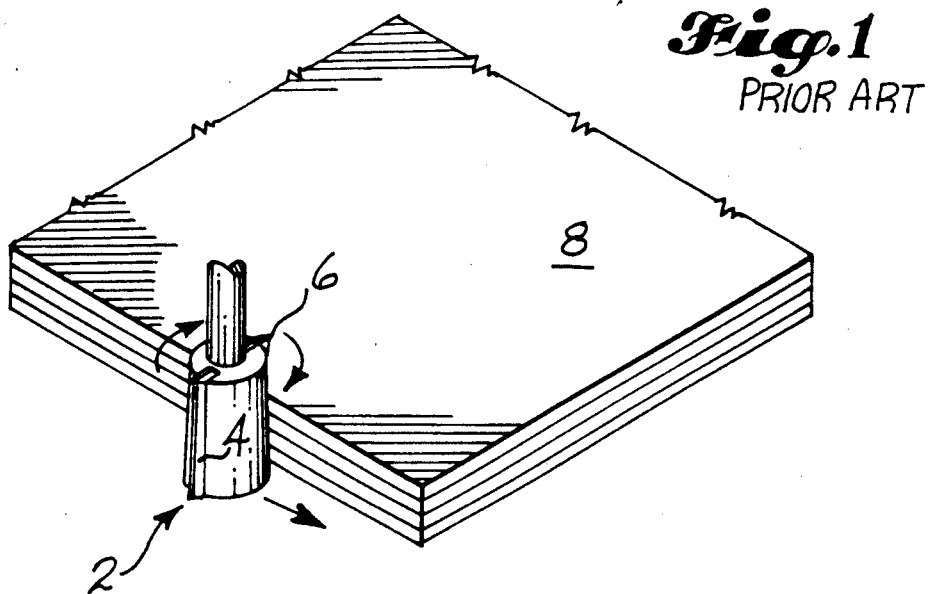
FIG. 1 is a pictorial view of a prior art PCD router finishing the edge of a laminated workpiece.
Figure 2:
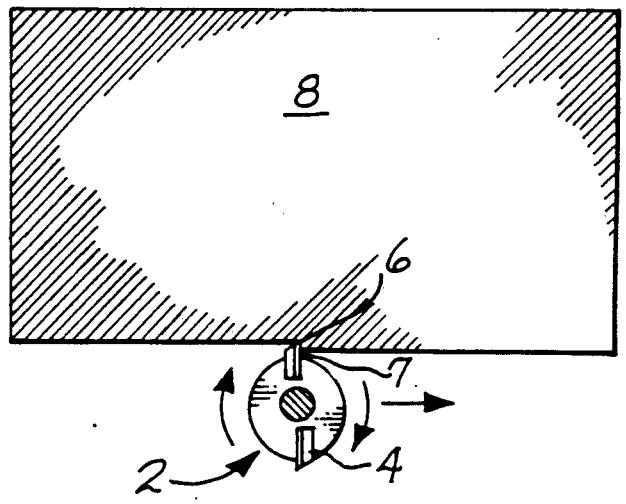
FIG. 2 is a plan view of the cutter and workpiece shown in FIG. 1.

FIGS. 1 and 2 illustrate the type of prior art PCD cutter discussed above. The cutter 2 includes two diametrically opposite inserts 4 each of which has a cutting edge 6 formed by a flat wafer of PCD. As best seen in FIG. 2, the end of the cutting face 7 of the PCD cutting element of each insert 4 is positioned along a radial line of the cutter 2. As shown in FIG. 1, the cutting face extends vertically through a radial plane parallel to the longitudinal axis of the cutter 2.

Figure 3:
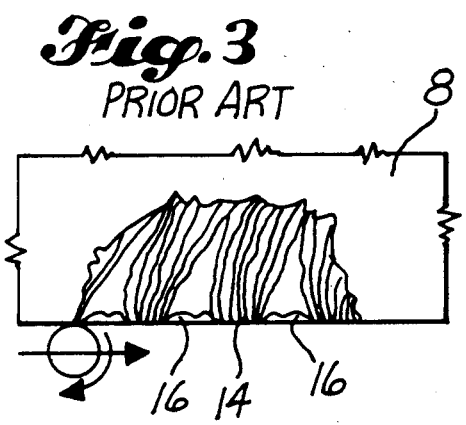
FIG. 3 is a fragmentary enlarged plan view of a portion of the workpiece shown in FIGS. 1 and 2 with foreground portions cut away to reveal an inner layer of the workpiece.
Figure 4:
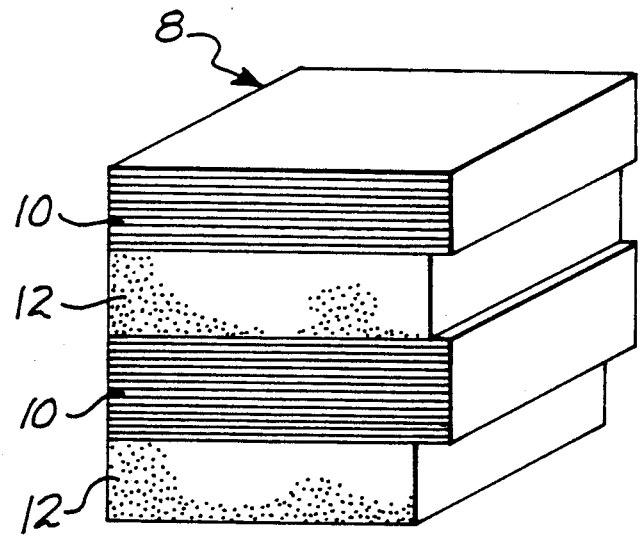
FIG. 4 is a greatly enlarged pictorial view of the finished workpiece.

FIGS. 3 and 4 illustrate the problems discussed above which have been encountered in connection with the use of the type of cutter shown in FIGS. 1 and 2. FIG. 3 illustrates the effect of the cutter action on a layer of the workpiece 8 having −45° fibers 14. As can be seen in FIG. 3, the fibers 14 adjacent to the machined edge are bent in the cutter feed direction and are grouped together in bunches. Voids 16 have been produced between the bunches of fibers 14. FIG. 4 illustrates in greatly exaggerated form the differential depth of cut of different layers of the workpiece 8. The 0° layers 10 are cut more deeply than the non 0° layers 12. These layers 12 include, for example, 90° fibers and/or ±45° fibers. The differential between the depth of the cut is especially pronounced between the 0° layers and the −45° layers.

A first preferred embodiment of the cutter 20 of the invention is shown in FIGS. 5-8. The cutter 20 has a cutter body 22 mounted on a spindle 23 in a known manner. The body 22 has a nominal outer surface which defines a cylinder 24, shown in broken lines in FIG. 7, having a longitudinal axis X and a cutting radius R. The cutter axis X corresponds to the spindle axis. The radius R coincides with the cutting edges 48 of the cutter 20. The cutter body 22 has a plurality of slots 26 opening onto the nominal outer surface of the cylinder 24. Each slot 26 extends along a plane that intersects the axis X at an acute axial rake angle A. The size of angle A may vary. Currently, it is anticipated that the angle A will in most cases preferably be between about 5° and about 15°.

The cutter 20 has four circumferentially spaced slots 26. The slots 26 are preferably positioned in the manner shown in FIGS. 5 and 6 with two slots 26 on the lower portion of the cutter 20 spaced 180° apart and two slots 26 on the upper portion of the cutter 20 spaced 180° from each other and 90° apart from each of the lower slots 26.

An essentially flat cutter blade insert 40 is positioned and secured, such as by brazing, in each of the four slots 26. The configuration of the insert 40 is best seen in FIGS. 7-9. The insert 40 includes a polycrystalline diamond cutting element 44 in the form of a flat wafer. The element 44 is fused onto a flat support 42 of a suitable material, such as carbide. The outer cutting face 46 of the PCD element 44 has an outer edge that forms an elliptical cutting edge 48 that extends along the cylindrical surface 24. The cutting edge 48 has a leading end 50 which, in use, first contacts a workpiece, and an opposite trailing end 52 which is the last portion of the cutting edge 48 to contact a workpiece.

The sidewall of each slot 26 adjacent to the cutting face 46 of the insert 40 secured in the slot 26 is cut away to form a pocket 30. This pocket 30 need only be deep enough to ensure that a sufficient portion of the cutting face 46 is exposed to permit sufficient cutting depth into a workpiece. The cutter 20 preferably has means for accommodating the straight edges of the insert 40 within the slot 26 without requiring precise machining of the insert 40 and/or cutter body 22 for precise mating of right angle surfaces. Preferably, the longer edges of the carbide support 42 that extend along the slot 26 are slightly rounded to allow the adjacent flat edges to mate easily with the corresponding flat surfaces of the slot 26. Also preferably, one or both of the ends of the slot 26 has a rounded tapered configuration 28 to avoid a need for precise mating of the shorter straight end edge of the insert 40 with a corner of the slot 26. Alternatively, the pocket 30 may be deepened to expose essentially the entire face 46 of the insert 40. This allows a small relief pocket 32 to be machined into the cutter body 22 to accommodate the end of the insert 40, as shown in FIG. 8.

FIG. 10 illustrates the second preferred embodiment of the cutter 20'. Like the first embodiment, this embodiment includes a cutter body 22' mounted on a spindle 23 and having a plurality of slots 26', each of which is oriented at an acute axial rake angle A. However, this embodiment differs in that the slots 26' are arranged in a herringbone pattern. This pattern is designed to resist delamination of a workpiece by producing downward axial cutting forces on the upper portion of a workpiece and upward axial cutting forces on the lower portion of the workpiece. These axial cutting forces tend to prevent the delamination of outer layers of a composite material workpiece. A similar herringbone-type pattern has previously been used in conventional helical cutters used for machining composite material parts.

Since the axial cutting forces of the cutter 20' resist delamination of both the upper and lower portions of the workpiece, the axial rake angle in cutters of this type may generally be greater than the axial rake angle in other embodiments of the cutter. At present, it is anticipated that axial rake angles of up to at least 30° will be practical in the herringbone pattern. The slots 26' of the cutter 20' are arranged in a manner similar to the slots 26 of the embodiment shown in FIGS. 5-8. However, instead of all of the slots sloping in the same direction as they do in the first embodiment, the upper slots 26' slope in an opposite direction from the lower slots 26'. Generally, it is preferred that each of the axial rake angles A have the same magnitude.

Figure 21:
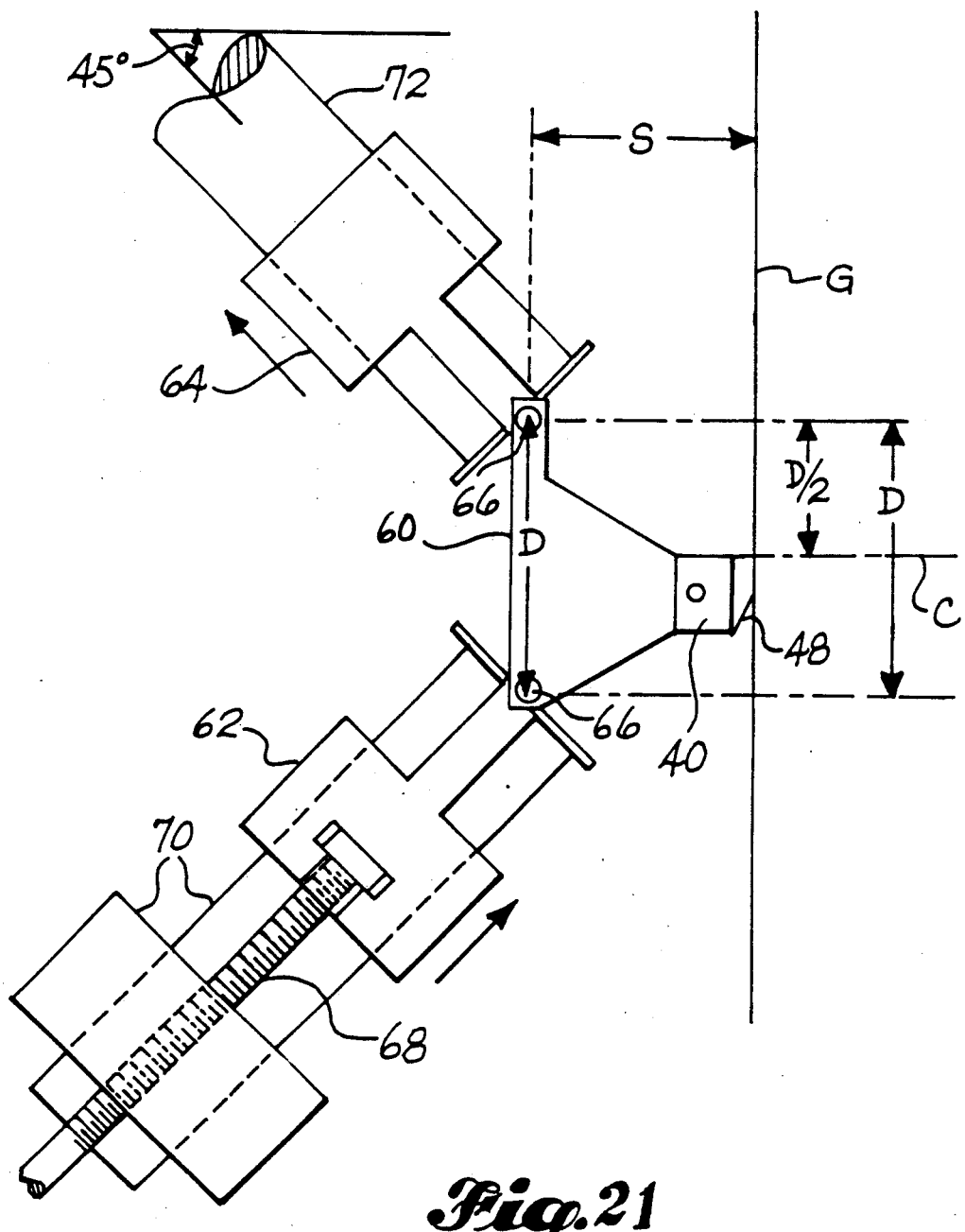
FIG. 21 is a partially schematic plan view of a fixture for grinding the elliptical cutting edge of the insert.

FIG. 21 is a partially schematic plan view of a fixture which has been developed by the applicant to grind the elliptical cutting edge 48 of the insert 40 to coincide with the nominal outer cylindrical surface 24 of the cutter body 22. The fixture includes an insert holder 60 to which the insert 40 is bolted, as shown. The insert holder 60 is pivotably attached to two sliding blocks 62, 64 by means of pivot pins 66. A screw feed mechanism 68 is mounted on a fixed support 70 to move one of the sliding blocks 62 and thereby pivot the insert holder 60 relative to the plane G of the grinding wheel (not shown) The other sliding block 64 is slidably mounted on a guide 72 to freely slide thereon when the holder 60 pivots. The geometry of the fixture is designed so that the pivotable movement of the holder 60 results in grinding of the edge of the PCD cutting element 44 into the desired elliptical shape. C is a center line of the fixture which is perpendicular to the line between the axes of the two pivot pins 66 and is halfway between the pins 66 when they are in their untilted orientation shown in FIG. 21. D is the distance between the pin axes. S is the distance between each pin axis and the plane G in the illustrated position. The distance D is determined by the following equation:

$$D = R((1/\sin A) - 1)$$

S is determined by the following equation:

$$S = R + D/2$$

The elliptical edge 48 is defined by the following equation:

$$Y_e^2 = R^2 - (X_e \sin A)^2$$

In these equations, R and A are the cutting radius and axial rake angle, respectively, of the cutter 20, 20'. The ellipse parameters $X_e$ and $Y_e$ are shown in FIG. 8.

The fixture shown in FIG. 21 has a number of advantages. The major advantage is that the fixture may be readily adapted to grind inserts for different cutters having different axial rake angles and/or cutting radii. This only requires replacing the insert holder 60 with another holder having dimensions determined by the parameters of the cutter. Another advantage is that the fixture is relatively simple in structure and reliable in operation. In addition, the use of this type of fixture avoids the need for complicated equipment or the very large holders which would be required to grind the insert 40 in a conventional manner using a circular path approximating the desired ellipse.

Figure 15:
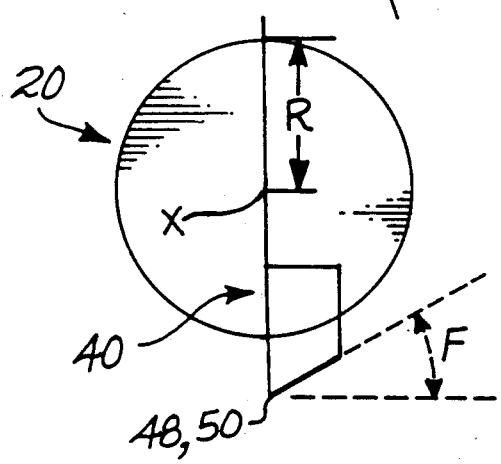

The inserts 40 of the cutter 20, 20' are preferably arranged so that each insert 40 has a non-negative radial rake at each point along its cutting edge 48. This is accomplished by positioning the insert 40 so that no radial line of the cylinder 24 through any point on the cutting edge 48 is circumferentially on a different side of the cutting face 46 than a radial line of the cylinder 24 through any other point on the cutting edge 46. This relationship can also be described in terms of a center radial plane. When the leading end of the cutting face 46 extends along a radial line of the cylinder 24, as shown in FIGS. 7 and 15, a vertical plane through the cutter body 22, 22' including this radial line defines the center radial plane P. If, as in a modified form of the insert of the invention, the leading end of the cutting face 46 does not coincide with a radial line, it may be extended to a radial line to determine the center radial plane P. The non-negative radial rake is produced by positioning every portion of the entire insert 40 on or behind the center radial plane P and not allowing any portion of the insert 40 to cross the plane P. The leading end 50 of the insert 40 is closer to the plane P than the trailing end 52.

FIGS. 14-17 illustrate the spatial relationship between the insert 40 and the radial lines R and center radial plane P of the cutter 20, 20'. As can be seen therein, this relationship produces coincidence of the cutting face 46 with a radial line R and the plane P at the leading end 50 of the cutting edge 48 and a receding of the insert 40 behind the line R and plane P back to the trailing end 52 of the insert 40. FIGS. 11-13 illustrate the resulting radial rake. FIG. 11 is a schematic elevation of the cutter 20, 20' showing a single insert 40 with the leading end 50 of the cutting face 46 on the radial plane P. FIG. 12 illustrates the 0° radial rake at the leading end 50. FIG. 13 illustrates the maximum positive radial rake Q at the trailing end 52 of the cutting edge 48.

The method of the invention is a method of making the cutter of the invention. The method includes forming a cutter body 22, 22' having the nominal outer cylindrical surface 24, longitudinal axis X, cutting radius R, and slots 26, 26' described above. An insert 40 is positioned and secured in each slot 26, 26', in a position in which the elliptical cutting edge 48 of the insert 40 extends along the outer surface of the cylinder 24. The insert 40 and cutter body 22, 22' are shaped to provide relief and clearance angles behind the cutting edge 48 to prevent contact between the workpiece and the insert 40 and/or cutting body 22, 22' behind the cutting edge 48.

Figure 18:
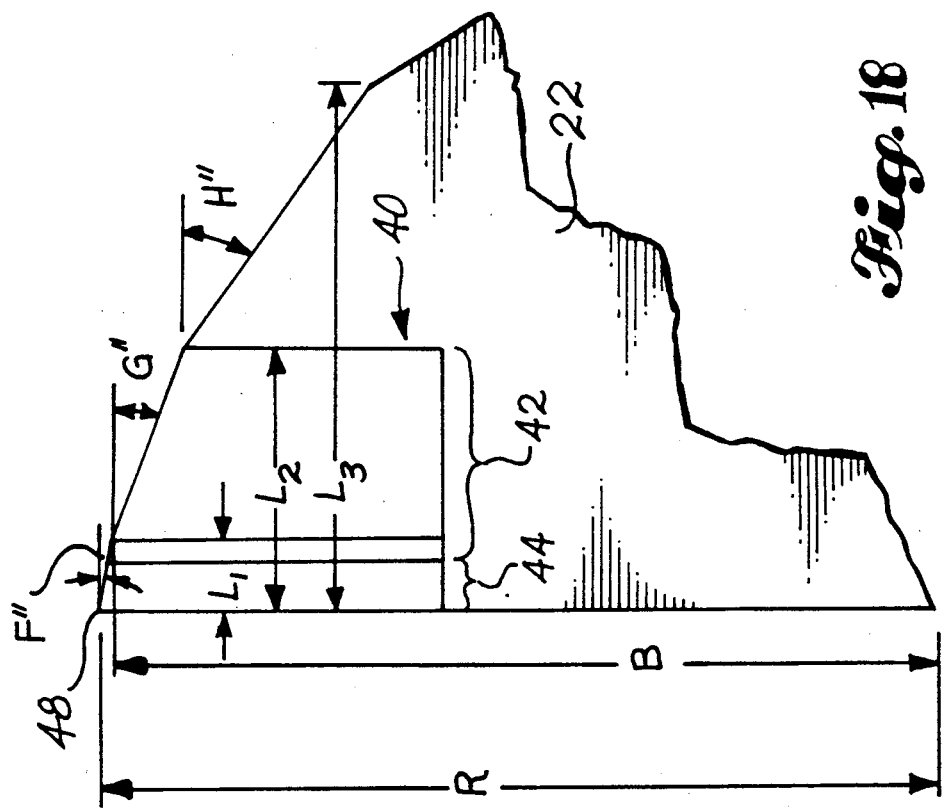
FIG. 18 is a schematic cross-sectional view of the cutter in a plane perpendicular to the longitudinal axis of the insert.
Figure 19:
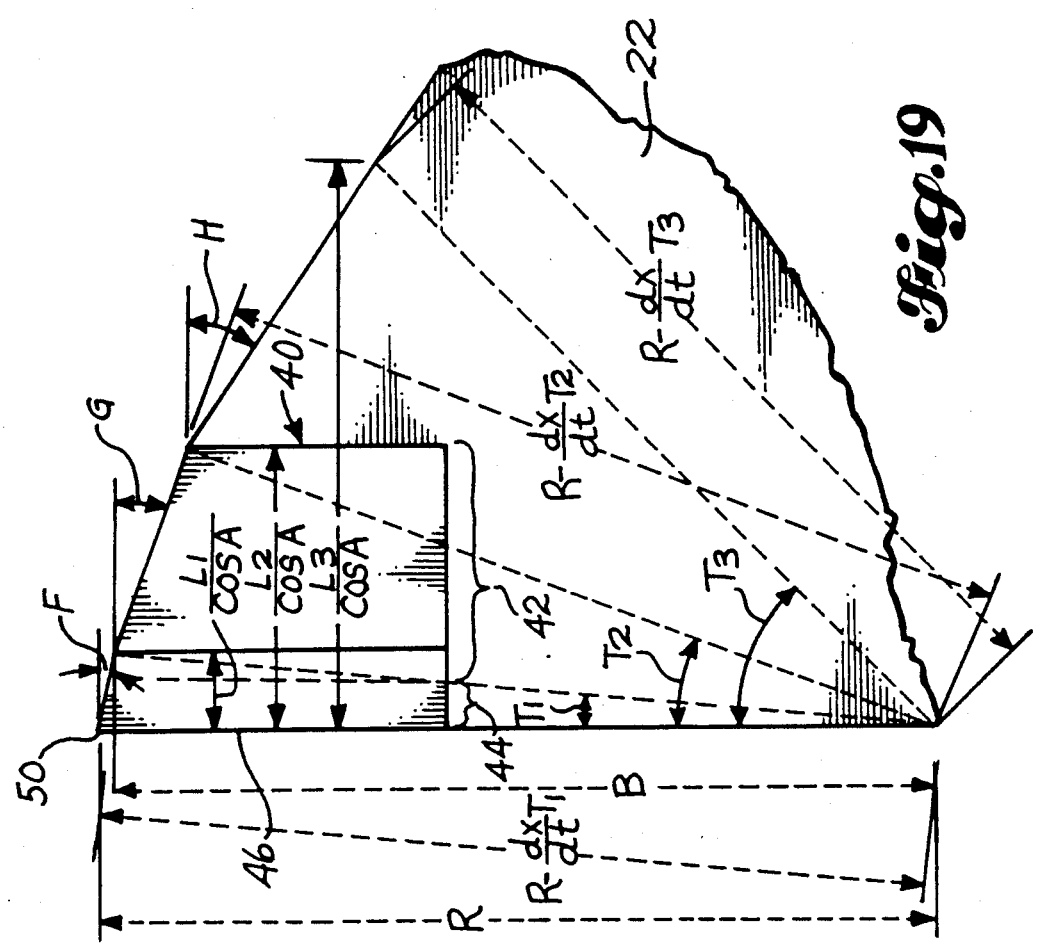
FIG. 19 is similar to FIG. 18 except that it shows a plane perpendicular to the longitudinal axis of the cutter.

The relief and clearance angles for each insert 40 may be provided in a single or a plurality of stages. In the preferred embodiment, they are provided in three stages, including a primary relief angle, a secondary relief angle, and a clearance angle. The primary relief angle, which is the angle immediately behind the cutting edge 48, is the most crucial. FIGS. 18 and 19 show each of these three angles at the leading end 50 in the plane perpendicular to the longitudinal axis Y of the insert 40. The axis Y is the axis along the length of the insert which forms the axial rake angle A with the longitudinal axis X of the cutter 20, 20', and in the plane perpendicular to the longitudinal axis X of the cutter 20, 20', respectively. The angles are also shown pictorially in FIG. 20.

Figure 14:
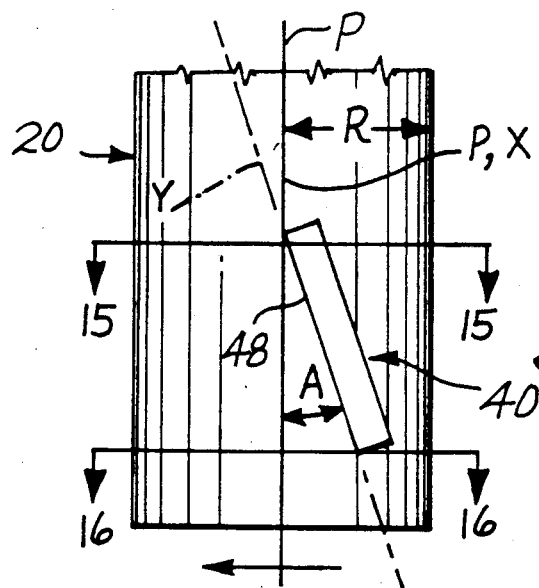
FIG. 14 is a schematic elevational view and FIGS. 15-17 are schematic sectional views illustrating the relief angles of the cutter shown in FIGS. 5-10.
Figure 16:
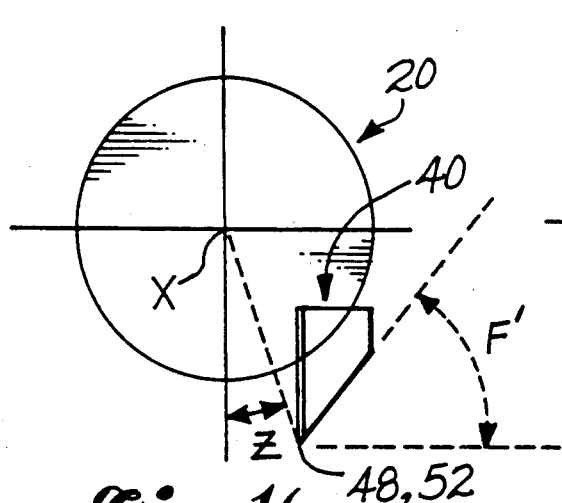
Figure 17:
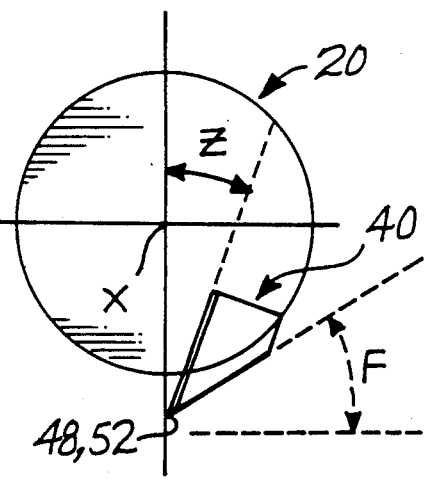

The basic requirement for the relationship between the primary relief angle F at the leading end 50 and such angle F' at the trailing end 52 is illustrated in FIGS. 14-17. FIG. 14 is a schematic elevational view of the cutter 20, 20' similar to FIG. 11. FIG. 15 is a schematic sectional view of the cutter shown in FIG. 14 showing the leading end 50 of the insert 40. FIG. 16 is a sectional view taken infinitesimally above the trailing end 52 to illustrate such end 52. FIG. 17 is similar to FIG. 16 except that it shows the cutter rotated through an angle Z. This angle Z is the amount of rotation of the cutter 20, 20' required to bring the trailing end 52 into contact with a workpiece 8 from a position in which the leading end 50 first contacts the workpiece 8. The angle Z is also the angle between radial lines R of the cylinder 24 through the leading end 50 and trailing end 52, respectively. FIG. 15 shows the relief angle F that is required at the leading end 50. FIGS. 16 and 17 illustrate the requirement that the relief angle F' at the trailing end 52 be equal to the relief angle F at the leading end 50 plus the angle Z. This relationship yields an effective relief angle at the trailing end 52 equal to the angle F, as shown in FIG. 17.

The method of the invention includes determining the relief angles required and forming such angles on the cutter 20, 20'. The grinding of the relief angles may be carried out after the inserts 40 are installed in the slots 26, 26' of the cutter 20, 20'. However, the grinding procedure is generally facilitated by grinding the inserts 40 and the cutter body 22, 22' separately. The primary relief angle at the leading end 50 is at least equal to the angle F, and the primary relief angle at the trailing end 52 is at least equal to the angle F'. A constant relief angle along the insert 40 may be formed. This angle must be at least equal to the angle F'. The use of a constant relief angle F' simplifies the procedure of forming the relief angle. However, it is generally preferred to provide a varying relief angle that increases continuously along the insert 40 from a minimum value at the leading end 50 to a maximum value at the trailing end 52. Preferably, at each point along the insert 40, the relief angle is equal to the angle which is required to produce an effective relief angle equal to the angle F. This preferred configuration ensures clearance of the insert 40 and cutter body 22, 22' and, at the same time, allows maximization of the material in the cutter body 22, 22' and in the insert tip to help maximize their strength.

Figure 20:
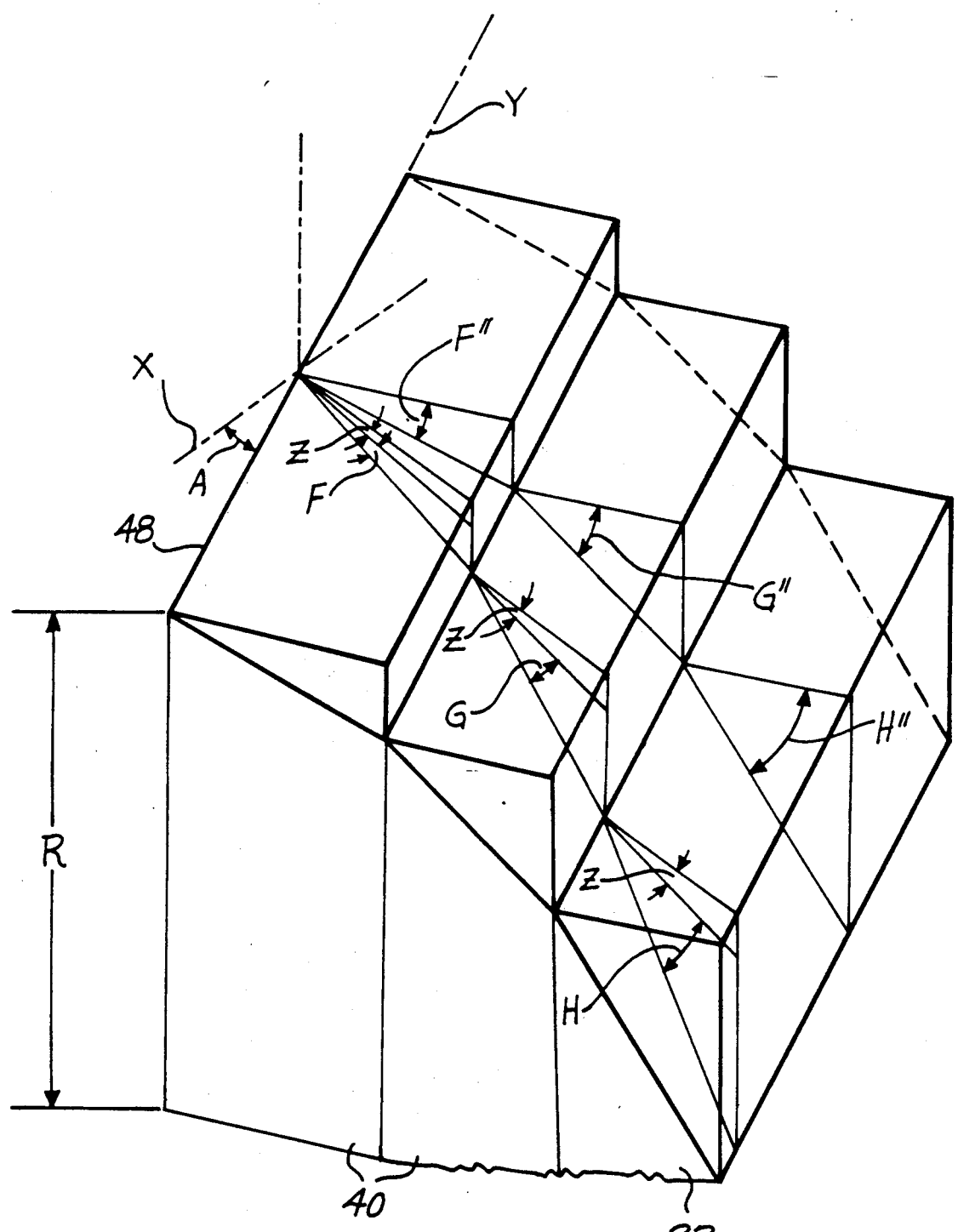
FIG. 20 is a pictorial schematic view of the cutter illustrating the relief angles.

FIGS. 18-20 illustrate the preferred method of calculating the relief and clearance angles and the relationship between such angles. In the calculations, R is the cutting radius of the cutter, dx/dt (inches per revolution) is the feed rate of the cutter, and A is the axial rake angle of the cutter. Each of these three parameters is predetermined. Referring to FIG. 18, $L_1$, $L_2$, and $L_3$ are the predetermined widths of the primary relief, secondary relief, and clearance in the plane perpendicular to the longitudinal axis Y of the insert 40. These widths are also predetermined. The primary width $L_1$ is chosen to be slightly wider than the PCD cutting element portion 44 of the insert 40. In order to simplify grinding of the insert 40 separately from the cutter body 22, 22', the secondary width $L_2$ is preferably chosen to be equal to the width of the insert 40. The clearance width $L_3$ is chosen on the basis of experience relating to the clearance required in cutters generally. The actual outer surface of the cutter body 22, 22', as opposed to the nominal cylindrical outer surface 24, behind the clearance cut is rounded to blend into the pocket 30 associated with the next insert 40.

Referring to FIG. 19, the reference characters $T_1$, $T_2$, $T_3$ indicate, in the plane perpendicular to the longitudinal axis X of the cutter 20, 20', the angles between the radial line R extending through the leading end 50 of the cutting face 46 and the radial lines through the back ends of the primary relief, secondary relief, and clearance cuts, respectively. The angle $T_1$ (in radians) is determined by iteration using the following equation:

$$\sin T_1(R - (dx/dt)T_1/6.283) = L_1/\cos A$$

The effective radius B at the intersection of the primary and secondary relief cuts projected onto the cutting face 46 of the insert 40 is determined by the following equation:

$$B = L_1/(\cos A \tan T_1)$$

The apparent primary relief angle F, the relief angle seen in the plane perpendicular to the longitudinal axis X of the cutter 20, 20' is calculated as follows:

$$F = \arctan(((R-B)\cos A)/L_1)$$

The angle $T_2$ (radians) is determined by iteration using the following equation:

$$\sin T_2(R - (dx/dt)T_2/6.283) = L_2/\cos A$$

The apparent secondary relief angle G is calculated as follows:

$$G = \arctan(\text{DELTA } M/\text{DELTA } N)$$

Where:

DELTA $M =$ $$\cos T_1(R - (dx/dt)T_1/6.283) - \cos T_2(R - (dx/dt)T_2/6.283)$$

$$\text{DELTA } N = L_2/\cos A - L_1/\cos A$$

Still referring to FIG. 19, the angle $T_3$ (radians) is determined by iteration using the following equation:

$$\sin T_3(R - (dx/dt)T_3/6.283) = L_3/\cos A$$

The apparent clearance angle H is calculated as follows:

$$H = \arctan(\text{DELTA } M/\text{DELTA } N)$$

Where:

DELTA $M =$ $$\cos T_2(R - (dx/dt)T_2/6.283) - \cos T_3(R - (dx/dt)T_3/6.283)$$

$$\text{DELTA } N = L_3/\cos A - L_2/\cos A$$

As noted above, the angle Z is the angle by which the relief angle must be increased from the leading end 50 to the trailing end 52 in order to achieve the same apparent relief angle at each of the two ends 50, 52. The angle Z may be calculated as follows:

$$Z = \arcsin(K \sin A/R)$$

The modified primary relief angle F', the angle required to achieve an apparent relief angle at the trailing end 52 equal to the apparent relief angle F at the leading end 50, is equal to the angle F plus the angle Z. As discussed above, the cutter 20, 20' may be ground to produce an apparent relief angle equal to F' along the entire length of the insert 40. In such case, K is the insert length. Alternatively, the apparent relief angle may vary along the insert 40. In such case, the parameter K in the above equation for determining the angle Z indicates the position along the insert 40 and is equal to the distance between the leading end 50 and the position along the insert 40 at which the modified apparent relief angle F' is to be determined. K is measured along the axis of the insert.

The above calculations relating to the modified apparent primary relief angle at each point along the insert 40 yield angles in the plane that is perpendicular to the longitudinal axis X of the cutter. Since the angle required by the person carrying out the operation to actually form the relief angles is the angle that is measured in the plane that is perpendicular to the longitudinal axis Y of the insert 40, rather than the longitudinal axis X of the cutter 20, 20', further calculations are required These calculations yield what are referred to as the "as-ground" relief angles. The primary as-ground relief angle F" is determined by the following equation:

$$F'' = \arctan(\tan F'/\cos A)$$

The as-ground secondary relief angle G" is determined as follows:

$$G'' = \arctan(\tan G'/\cos A)$$

Where G' is the modified secondary relief angle equal to G plus Z.

The as-ground clearance angle H" is determined by the following equation:

$$H'' = \arctan(\tan H'/\cos A)$$

Where H' is the modified clearance angle equal to H plus Z.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A cutter comprising:
   a body having a nominal outer surface defining a cylinder with a longitudinal axis and a cutting radius, and a slot opening onto said surface and extending along a plane that intersects said axis at an acute axial rake angle; and
   an essentially flat cutter blade insert secured in said slot and having an elliptical cutting edge extending along said surface;
   in which said body has a plurality of said slots, and a plurality of said inserts, each said insert being secured in a different one of said slots; and
   in which said slots are arranged in a herringbone pattern to produce axial cutting forces that resist delamination of a workpiece.

2. The cutter of claim 1, in which each insert comprises a flat wafer of polycrystalline diamond which forms said cutting edge.

3. A cutter comprising:
   a body having a nominal outer surface defining a cylinder with a longitudinal axis and a cutting radius, and a slot opening onto said surface and extending along a plane that intersects said axis at an acute axial rake angle; and
   an essentially flat cutter blade insert secured in said slot and having an elliptical cutting edge extending along said surface;
   in which said cutting edge has a first leading end, and a second opposite end; a minimum relief angle is required at said first end to prevent contact between said cutter and a workpiece behind said cutting edge; and said cutter has a first relief angle at said first end at least as great as said minimum relief angle, and a second relief angle at said second end at least as great as said minimum relief angle plus the angle between radial lines of said cylinder through said first and second ends, respectively.

4. The cutter of claim 3, in which said cutter has a constant relief angle along said insert equal to said second relief angle.

5. The cutter of claim 3, in which said cutter has a variable relief angle along said insert.

6. The cutter of claim 3, in which said insert comprises a flat wafer of polycrystalline diamond which forms said cutting edge.

7. The cutter of claim 3, in which said insert is positioned to produce a non-negative radial rake at each point along said cutting edge.

8. A method of making a cutter with a cutting edge formed by a flat piece of polycrystalline diamond, comprising:
   forming a body having a nominal outer surface defining a cylinder with a longitudinal axis and a cutting radius, including forming in said body a slot opening onto said surface and extending along a plane that intersects said axis at an acute axial rake angle;
   providing an essentially flat cutter blade insert including a piece of polycrystalline diamond with a cutting face having an outer edge that forms an elliptical cutting edge;
   positioning and securing said insert in said slot in a position in which said elliptical cutting edge extends along said surface;
   determining a minimum relief angle required at the leading end of said cutting edge to prevent contact between said cutter and a workpiece behind said cutting edge; and
   forming on said cutter a relief angle along said insert that is, at said leading end, at least as great as said minimum relief angle and, at the opposite end of said cutting edge, at least as great as said minimum relief angle plus an angle defined between radial lines of said cylinder through said leading and opposite ends, respectively.

9. The method of claim 8, in which the step of positioning said insert includes positioning said insert to produce a non-negative rake at each point along said cutting edge.

10. The method of claim 8, in which the step of forming a relief angle includes forming a constant relief angle along said insert.

11. The method of claim 8, in which the step of forming a relief angle includes varying the relief angle along said insert from a minimum value at said leading end to a maximum value at said opposite end.

12. The method of claim 8, comprising forming a plurality of said slots in said body, providing a plurality of said inserts, and positioning and securing one of said inserts in each said slot.

13. The method of claim 9, comprising forming a plurality of said slots in said body, providing a plurality of said inserts, and positioning and securing one of said inserts in each said slot.

14. The method of claim 12, comprising circumferentially spacing said slots on said surface, and orienting each said slot at the same axial rake angle.

15. The method of claim 12, comprising arranging said slots in a herringbone pattern to produce axial cutting forces that resist delamination of a workpiece.

16. The cutter of claim 3, in which said first relief angle is substantially equal to said minimum relief angle, and said second relief angle is substantially equal to said minimum relief angle plus said angle defined between radial lines.

17. The method of claim 8, in which the step of forming a relief angle includes forming a variable relief angle that is, at said leading end, substantially equal to said minimum relief angle and, at said opposite end, substantially equal to said minimum relief angle plus said angle defined between radial lines.

* * * * *

UNITED STATES PATENT AND TRADEMARK OFFICE
CERTIFICATE OF CORRECTION

PATENT NO. : 4,988,241

DATED : January 29, 1991

INVENTOR(S) : Kevin J. Colligan

It is certified that error appears in the above-identified patent and that said Letters Patent is hereby corrected as shown below:

On the cover page, under "U.S. PATENT DOCUMENTS", "4,603,364" should be -- 4,683,364 --; and under "FOREIGN PATENT DOCUMENTS", "Australia" should be -- Austria --.

Col. 1, line 21, there is a period after "fibers", first occurrence.
Col. 1, line 22, there is a period after "abrasive".
Col. 1, line 34, there is a period after "wafers".
Col. 1, lines 44 and 45, there is a period after "elements".
Col. 3, line 37, there is a period after "angle".
Col. 4, line 58, "Illustrating" should be -- illustrating --.
Col. 7, line 10, there is a period after "shown)".

Signed and Sealed this

Fifteenth Day of September, 1992

*Attest:*

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 4,988,241

DATED : January 29, 1991

INVENTOR(S) : Kevin J. Colligan

It is certified that error appears in the above-identified patent and that said Letters Patent is hereby corrected as shown below:

Col. 11, line 64, (claim 3) "plus the angel between" should read --plus an angle defined between--.

Signed and Sealed this

Twentieth Day of October, 1992

Attest:

DOUGLAS B. COMER

Attesting Officer

Acting Commissioner of Patents and Trademarks